United States Patent
Budagavi et al.

(10) Patent No.: US 12,413,750 B2
(45) Date of Patent: Sep. 9, 2025

(54) SIGNALING OF MULTIVIEW TILED VOLUMETRIC VIDEO

(71) Applicant: Samsung Electronics Co., Ltd., Suwon-si (KR)

(72) Inventors: Madhukar Budagavi, Plano, TX (US); Rajan Laxman Joshi, San Diego, CA (US); Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 18/520,421

(22) Filed: Nov. 27, 2023

(65) Prior Publication Data
US 2024/0187615 A1    Jun. 6, 2024

Related U.S. Application Data

(60) Provisional application No. 63/429,347, filed on Dec. 1, 2022.

(51) Int. Cl.
*H04N 19/184*    (2014.01)
*H04N 19/119*    (2014.01)

(52) U.S. Cl.
CPC ......... *H04N 19/184* (2014.11); *H04N 19/119* (2014.11)

(58) Field of Classification Search
None
See application file for complete search history.

(56) References Cited

U.S. PATENT DOCUMENTS

2024/0291981 A1 *  8/2024  Zare ............... H04N 19/174

* cited by examiner

*Primary Examiner* — Nam D Pham

(57) ABSTRACT

An apparatus includes a communication interface configured to receive a bitstream for a compressed video and a processor operably coupled to the communication interface. The processor is configured to decode the bitstream for the compressed video. The processor is also configured to identify a mapping of view numbers of a plurality of images and a plurality of subpicture identifiers, each of the plurality of subpicture identifiers associated with a defined location in a video frame, wherein the mapping is signaled in the bitstream, and wherein each one of the view numbers is assigned to one image of the plurality of images based on a corresponding one of a plurality of camera viewpoints of a scene. The processor is also configured to instruct a display of at least one image based on at least one of the plurality of images.

20 Claims, 16 Drawing Sheets

| VIEW 0 | VIEW 1 | VIEW 2 |
| --- | --- | --- |
| VIEW 3 | VIEW 4 | VIEW 5 |
| VIEW 6 | VIEW 7 | VIEW 8 |

SIGNALING OF MULTIVIEW TILED VOLUMETRIC VIDEO

CROSS-REFERENCE TO RELATED APPLICATION AND PRIORITY CLAIM

This application claims priority under 35 U.S.C. § 119(e) to U.S. Provisional Patent Application No. 63/429,347 filed on Dec. 1, 2022, which is hereby incorporated by reference in its entirety.

TECHNICAL FIELD

This disclosure relates generally to multimedia devices and processes. More specifically, this disclosure relates to signaling of multiview tiled volumetric video.

BACKGROUND

Three hundred sixty degree (360°) video and three dimensional (3D) volumetric video are emerging as new ways of experiencing immersive content due to the ready availability of powerful handheld devices such as smartphones. While 360° video enables an immersive "real life," "being-there," experience for consumers by capturing the 360° outside-in view of the world, 3D volumetric video can provide a complete six degrees of freedom (DoF) experience of being immersed and moving within the content. Users can interactively change their viewpoint and dynamically view any part of the captured scene or object they desire. Display and navigation sensors can track head movement of a user in real-time to determine the region of the 360° video or volumetric content that the user wants to view or interact with. Multimedia data that is 3D in nature, such as point clouds or 3D polygonal meshes, can be used in the immersive environment. The video data can be stored in a video format and encoded and compressed for transmission as a bitstream to other devices.

SUMMARY

This disclosure provides signaling of multiview tiled volumetric video.

In a first embodiment, an apparatus includes a communication interface configured to receive a bitstream for a compressed video and a processor operably coupled to the communication interface. The processor is configured to decode the bitstream for the compressed video. The processor is also configured to identify a mapping of view numbers of a plurality of images and a plurality of subpicture identifiers, each of the plurality of subpicture identifiers associated with a defined location in a video frame, wherein the mapping is signaled in the bitstream, and wherein each one of the view numbers is assigned to one image of the plurality of images based on a corresponding one of a plurality of camera viewpoints of a scene. The processor is also configured to instruct a display of at least one image based on at least one of the plurality of images.

In a second embodiment, a method includes receiving and decoding a bitstream for a compressed video. The method also includes identifying a mapping of view numbers of a plurality of images and a plurality of subpicture identifiers, each of the plurality of subpicture identifiers associated with a defined location in a video frame, wherein the mapping is signaled in the bitstream, and wherein each one of the view numbers is assigned to one image of the plurality of images based on a corresponding one of a plurality of camera viewpoints of a scene. The method also includes instructing a display of at least one image based on at least one of the plurality of images.

In a third embodiment, an apparatus includes a communication interface and a processor operably coupled to the communication interface. The processor is configured to obtain a plurality of images each corresponding to one of a plurality of camera viewpoints of a scene. The processor is also configured to assign a view number to each image of the plurality of images based on the corresponding one of the plurality of camera viewpoints of the scene. The processor is also configured to map the view number of each image of the plurality of images to one of a plurality of subpicture identifiers each associated with a defined location in a video frame. The processor is also configured to combine the plurality of images into the video frame according to the subpicture identifiers. The processor is also configured to compress and transmit the video frame as part of a bitstream, wherein the mapping of the view numbers and the plurality of subpicture identifiers is signaled in the bitstream.

In a fourth embodiment, a method includes obtaining a plurality of images each corresponding to one of a plurality of camera viewpoints of a scene. The method also includes assigning a view number to each image of the plurality of images based on the corresponding one of the plurality of camera viewpoints of the scene. The method also includes mapping the view number of each image of the plurality of images to one of a plurality of subpicture identifiers each associated with a defined location in a video frame. The method also includes combining the plurality of images into the video frame according to the subpicture identifiers. The method also includes compressing and transmitting the video frame as part of a bitstream, wherein the mapping of the view numbers and the plurality of subpicture identifiers is signaled in the bitstream.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
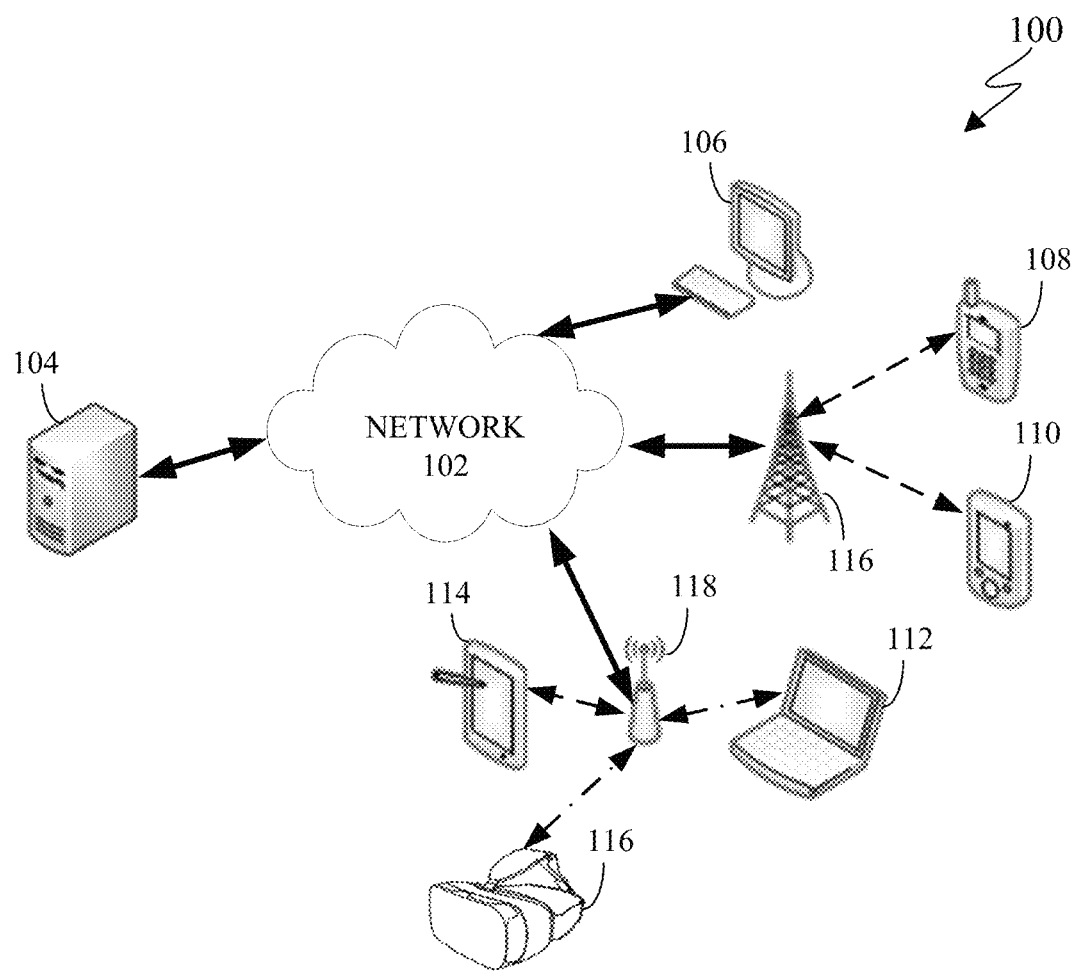
FIG. 1 illustrates an example communication system in accordance with this disclosure.

FIGS. 1 through 12, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As noted above, three hundred sixty degree (360°) video and three dimensional (3D) volumetric video are emerging as new ways of experiencing immersive content due to the ready availability of powerful handheld devices such as smartphones. While 360° video enables an immersive "real life," "being-there," experience for consumers by capturing the 360° outside-in view of the world, 3D volumetric video can provide a complete six degrees of freedom (DoF) experience of being immersed and moving within the content. Users can interactively change their viewpoint and dynamically view any part of the captured scene or object they desire. Display and navigation sensors can track head movement of a user in real-time to determine the region of the 360° video or volumetric content that the user wants to view or interact with. Multimedia data that is 3D in nature, such as point clouds or 3D polygonal meshes, can be used in the immersive environment. The video data can be stored in a video format and encoded and compressed for transmission as a bitstream to other devices.

Another volumetric video format is multiview tiled volumetric video (MTVV) format for use in next-generation volumetric displays. Next-generation volumetric displays are showing promise in providing realistic immersive and holographic experiences. The MTVV format uses video captured using multiple cameras and aligned and tiled into a single video frame. The tiled video can then be compressed and distributed. At the receiving end, i.e., at the decoder side, the video is decompressed and fed to the volumetric display. However, more efficient methods of compression and signaling of MTVV video is needed.

In volumetric video, a point cloud is a set of 3D points along with attributes such as color, normal directions, reflectivity, point-size, etc. that represent an object's surface or volume. Point clouds are common in a variety of applications such as gaming, 3D maps, visualizations, medical applications, augmented reality, virtual reality, autonomous driving, multi-view replay, and six degrees of freedom (DoF) immersive media, to name a few. Point clouds, if uncompressed, generally require a large amount of bandwidth for transmission. Due to the large bitrate requirement, point clouds are often compressed prior to transmission. Compressing a 3D object such as a point cloud often requires specialized hardware. To avoid specialized hardware to compress a 3D point cloud, a 3D point cloud can be transformed into traditional two-dimensional (2D) frames and that can be compressed and later reconstructed and viewable to a user. These 2D frames can be used in multiview video formats such as described in this disclosure.

Polygonal 3D meshes, especially triangular meshes, are another popular format for representing 3D objects. Meshes typically consist of a set of vertices, edges and faces that are used for representing the surface of 3D objects. Triangular meshes are simple polygonal meshes in which the faces are simple triangles covering the surface of the 3D object.

Typically, there may be one or more attributes associated with the mesh. In one scenario, one or more attributes may be associated with each vertex in the mesh. For example, a texture attribute (RGB) may be associated with each vertex. In another scenario, each vertex may be associated with a pair of coordinates, (u, v). The (u, v) coordinates may point to a position in a texture map associated with the mesh. For example, the (u, v) coordinates may refer to row and column indices in the texture map, respectively. A mesh can be thought of as a point cloud with additional connectivity information.

The point cloud or meshes may be dynamic, i.e., they may vary with time. In these cases, the point cloud or mesh at a particular time instant may be referred to as a point cloud frame or a mesh frame, respectively. Since point clouds and meshes contain a large amount of data, they require compression for efficient storage and transmission. This is particularly true for dynamic point clouds and meshes, which may contain 60 frames or higher per second. These point clouds or meshes can be used in multiview video formats such as described in this disclosure.

This disclosure provides improvements to the compression efficiency and signaling of tiled multiview video. Embodiments of this disclosure provide that, when a multiview video format is used, the tiled video can be formatted into subpictures to improve compression efficiency and decoders can extract only a subset of the views that are needed and display those views. This disclosure also provides for improved compression and signaling of multiview videos. For example, on the encoder side, this disclosure provides that a plurality of images each corresponding to one of a plurality of camera viewpoints of a scene is obtained, a view number is assigned to each image of the plurality of images based on the corresponding one of the plurality of camera viewpoints of the scene, the view number of each image of the plurality of images is mapped to one of a plurality of subpicture identifiers each associated with a defined location in a video frame, the plurality of images is combined into the video frame according to the subpicture identifiers, and the video frame is compressed and transmitted as part of a bitstream, wherein the mapping of the view numbers and the plurality of subpicture identifiers is signaled in the bitstream.

On the decoder side, the bitstream for the compressed video is decoded, a mapping of view numbers of a plurality of images and a plurality of subpicture identifiers is identified, where each of the plurality of subpicture identifiers associated with a defined location in a video frame, where the mapping is signaled in the bitstream, and where each one of the view numbers is assigned to one image of the plurality of images based on a corresponding one of a plurality of camera viewpoints of a scene. The decoding device then instructs a display of at least one image based on at least one of the plurality of images.

This disclosure also provides that a first image set of the plurality of images in the multiview video frame can be at a first resolution, and a second image set of the plurality of images is at a second resolution that is a reduced resolution relative to the first resolution. This can be dependent on a user viewing angle, such that views in the video frame that are associated with the user view angle are sent at a higher resolution, while images that are farther away from the user view angle are sent at a lower resolution to improve compression efficiency and reduce the size of the compressed video data.

FIG. 1 illustrates an example communication system 100 in accordance with this disclosure. The embodiment of the communication system 100 shown in FIG. 1 is for illustration only. Other embodiments of the communication system 100 can be used without departing from the scope of this disclosure.

As shown in FIG. 1, the communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh and/or volumetric tiled multiview video to one or more display devices, such as a client device 106-116. In certain embodiments, each server 104 can include an encoder. In certain embodiments, the server 104 can perform compression/decompression and signaling of multi-view tiled volumetric video as described in this disclosure.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more dynamic or static 3D point clouds and/or one or more views from a multiview video. In certain embodiments, any of the client devices 106-116 can include an encoder, decoder, or both. For example, the mobile device 108 can record a 3D volumetric video and then encode the video enabling the video to be transmitted to one of the client devices 106-116. In another example, the laptop computer 112 can be used to generate a 3D point cloud or mesh and/or multiview video, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh and/or a multiview video, generate a bitstream that represents the point cloud or mesh and/or multiview video, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud or mesh and/or multiview video, compress a 3D point cloud or mesh and/or multiview video, transmit a 3D point cloud or mesh and/or multiview video, receive a 3D point cloud or mesh and/or multiview video, decode a 3D point cloud or mesh and/or multiview video, render a 3D point cloud or mesh and/or multiview video, or a combination thereof. For example, the server 104 can compress a 3D point cloud or mesh and/or multiview video to generate a bitstream and then transmit the bitstream to one or more of the client devices 106-116. As another example, one of the client devices 106-116 can compress a 3D point cloud or mesh and/or multiview video to generate a bitstream and then transmit the bitstream to another one of the client devices 106-116 or to the server 104. In accordance with this disclosure, the server 104 and/or the client devices 106-116 can perform compression/decompression and signaling of multi-view tiled volumetric video as described in this disclosure.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
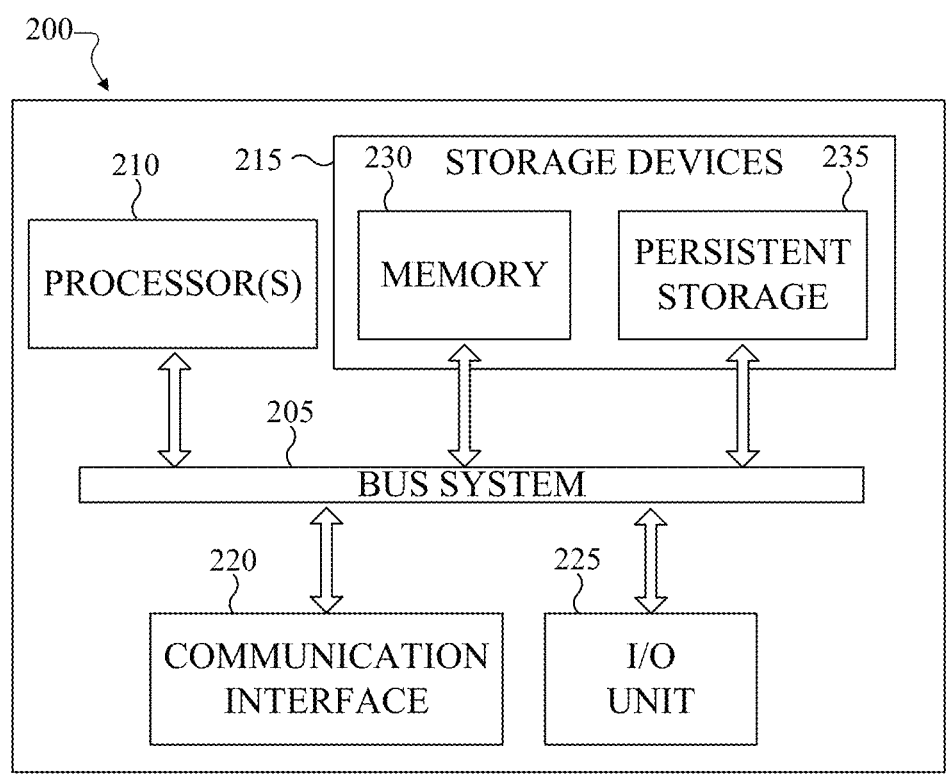
FIGS. 2 and 3 illustrate example electronic devices in accordance with this disclosure.
Figure 3:
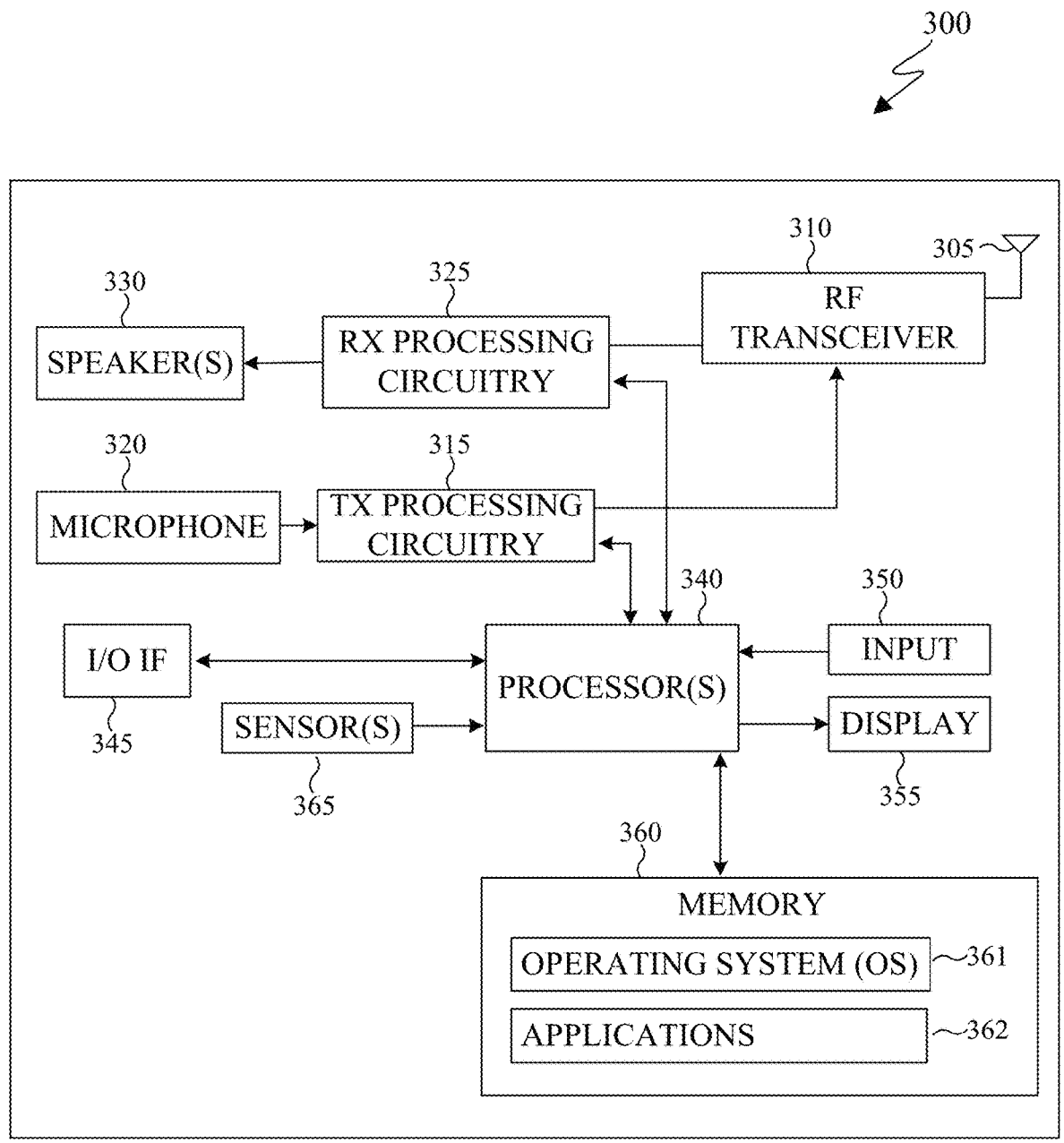

FIGS. 2 and 3 illustrate example electronic devices in accordance with this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode a 3D point cloud or mesh and/or multiview video stored within the storage devices 215. In certain embodiments, encoding a 3D point cloud and/or multiview video also decodes the 3D point cloud or mesh and/or the multiview video to ensure that when the point cloud or mesh and/or multiview video is reconstructed, the reconstructed 3D point cloud or mesh and/or multiview video matches the 3D point cloud or mesh and/or multiview video prior to the encoding. In certain embodiments, the processor 210 can perform compression/decompression and signaling of the multi-view tiled volumetric video as described in this disclosure.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering the point cloud on an omnidirectional 360° scene, as viewed through a VR headset, such as HMD 116 of FIG. 1. The instructions stored in the memory 230 can also include instructions for compression/decompression and signaling of multi-view tiled volumetric video as described in this disclosure The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud and/or a multiview video to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116.

For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content. In certain embodiments, the processor 340 can perform compression/decompression and signaling of multi-view tiled volumetric video as described in this disclosure.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud or mesh and/or volumetric multiview video.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, volumetric multiview video, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
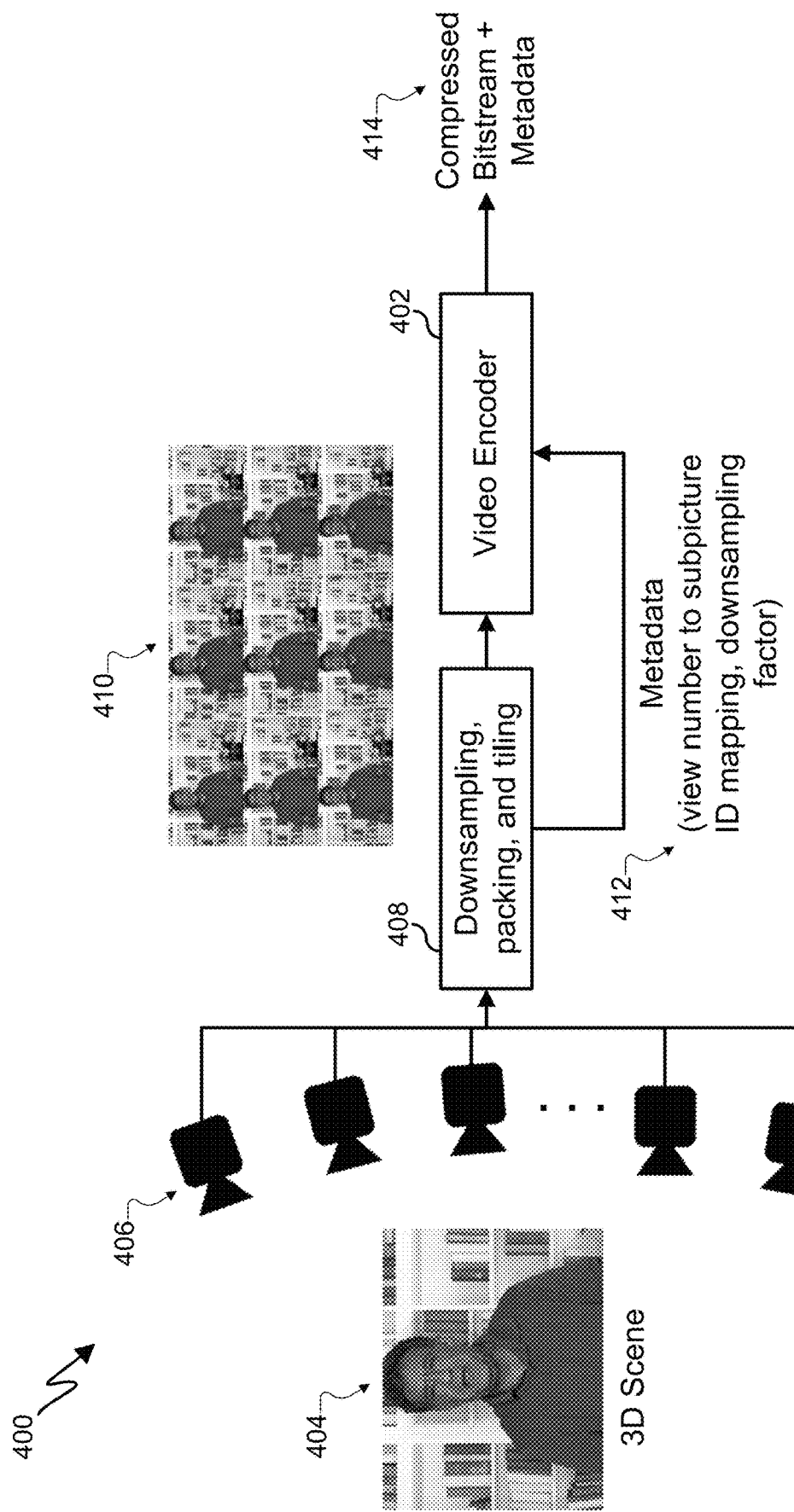
FIG. 4 illustrates an example encoding process in accordance with this disclosure.

FIG. 4 illustrates an example encoding process 400 in accordance with this disclosure. The encoding process 400 illustrated in FIG. 4 is for illustration only. FIG. 4 does not limit the scope of this disclosure to any particular implementation of an encoding process.

As shown in FIG. 4, the encoding process involves a video encoder 402 that compresses volumetric video content in a format such as multiview volumetric video (MTVV) format for eventual display on volumetric displays. As shown in FIG. 4, the volumetric video can include video of a 3D scene 404 captured using multiple cameras 406 to provide a plurality of views of the 3D scene 404. A downsampling, packing, and tiling operation or operations 408 can downsample one or more views of the 3D scene 404, pack each downsampled view into a video frame, and tile the video frame such to provide a tiled video frame 410 that includes each view in a single video frame, where each view is aligned and tiled into the single video frame. It will be understood that a plurality of tiled video frames 410 can be created for each frame captured and associated with the video of the 3D scene.

The downsampling, packing, and tiling operation or operations 408 can also provide to the video encoder 402 metadata 412. The metadata 412 can include a view number to subpicture ID mapping as further described in this disclosure, as well as a downsampling factor used for each downsampled view as further described in this disclosure. The tiled video is compressed using the video encoder 402 to create a compressed bitstream 414 that also includes the volumetric video and the metadata 412. The compressed bitstream can be distributed via transmission to one or more other devices capable of decoding the video. At the receiving end, this video can be decompressed by a decoder and fed to a volumetric display. The encoding process 400 thus outputs a compressed bitstream that can, for example, be transmitted to, and decoded by, an electronic device such as the server 104 or the client devices 106-116.

Although FIG. 4 illustrates an example encoding process 400, various changes may be made to FIG. 4. For example, the number and placement of various components of the encoding process 400 can vary as needed or desired. In addition, the encoding process 400 may be used in any other suitable process and is not limited to the specific processes described above. As another example, the encoding process 400 of FIG. 4 can include using volumetric multiview video compression and signaling schemes as further described in this disclosure.

Figure 5A:
FIGS. 5A and 5B illustrate an example volumetric multiview video frame and an example associated view mapping in accordance with this disclosure.
Figure 5B:

FIGS. 5A and 5B illustrate an example volumetric multiview video frame 500 and an example associated view mapping 501 in accordance with this disclosure. For ease of explanation, the volumetric multiview video frame 500 and the view mapping 501 may be described as being used by the electronic device 300 of FIG. 3. However, the volumetric multiview video frame 500 and the view mapping 501 may be used with any other suitable system and any other suitable electronic device.

As shown in FIG. 5A, the example volumetric multiview video frame 500 shows that video is captured using multiple cameras, e.g., nine cameras which capture the same scene from nine different viewpoints. Each view is mapped as shown in the mapping 501 of FIG. 5B, where View 0 to View 8 are mapped to the nine views in the example volumetric multiview video frame 500. The videos from the multiple cameras are aligned and tiled into a single video frame as shown in FIG. 5A. The tiled video can be compressed and distributed to one or more other devices for decoding and display of the tiled video.

Although FIGS. 5A and 5B illustrate an example volumetric multiview video frame 500 and an example view mapping 501, various changes may be made to FIGS. 5A and 5B. For example, any number of views can be used, such as 45 different views. Additionally, while a particular scene at various view angles of a man sitting in front of a bookshelf is used for illustration, any scene can be captured using the multiple cameras at the different view angles and tiled and mapped to view numbers as shown in FIGS. 5A and 5B. Further, while MTVV format can be used, other formats such as mesh point cloud video formats can be similarly tiled and mapped according to the various viewpoints.

Figure 6A:
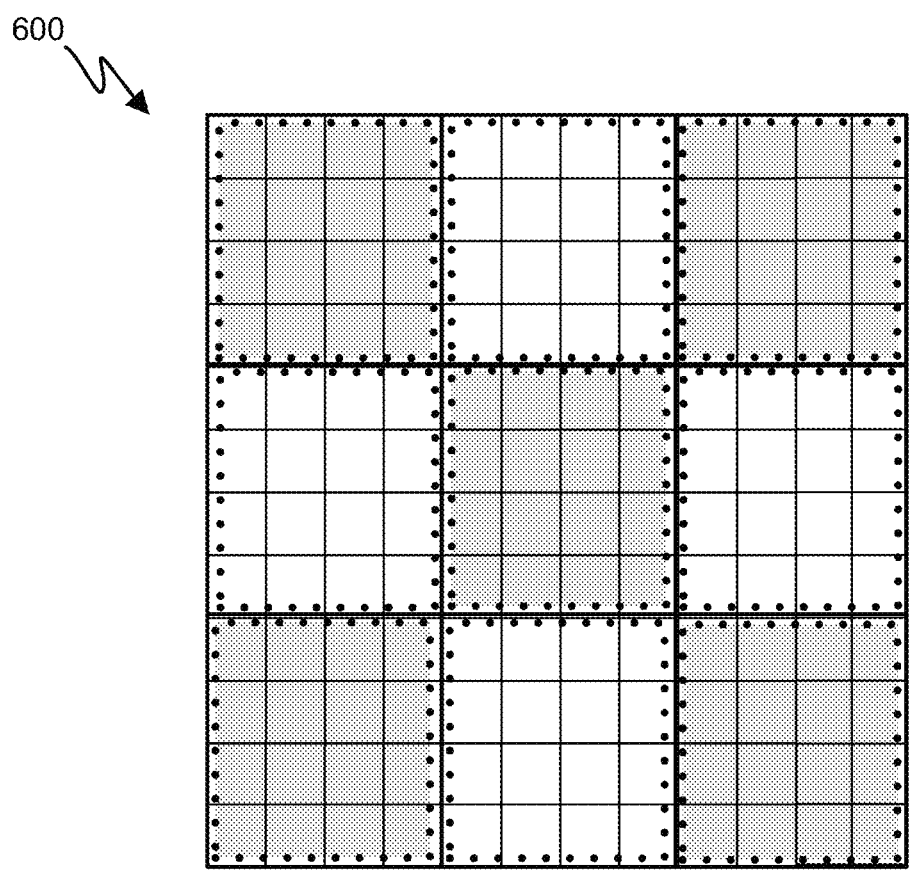
FIGS. 6A and 6B illustrate an example subpicture arrangement and an example volumetric multiview video frame using subpictures in accordance with this disclosure.
Figure 6B:

FIGS. 6A and 6B illustrate an example subpicture arrangement 600 and an example volumetric multiview video frame 601 using subpictures in accordance with this disclosure. For ease of explanation, the subpicture arrangement 600 and the volumetric multiview video frame 601 may be described as being used by the electronic device 300 of FIG. 3. However, the subpicture arrangement 600 and the volumetric multiview video frame 601 may be used with any other suitable system and any other suitable electronic device.

Video coding standards, such as H.266/Versatile Video Coding (VVC), can support use of subpictures as shown in FIGS. 6A and 6B. Subpictures are useful to realize spatial random access such as accessing a region of 360-degree video. Subpicture boundaries are treated as picture boundaries. Motion vectors that point outside of a sub-picture can also be padded using data from sub-picture boundary. Subpictures are independently decodable and re-composition of subpictures for various applications is possible without header re-writing. Subpictures are also useful at least because subpictures support viewport-dependent 360-degree video delivery, and each subpicture can be decoded without reference to any particular subpicture.

Subpictures can be used for various video formats including multiview tiled volumetric video (MTVV) format, as shown by the example volumetric multiview video frame 601 in FIG. 6B. Improved compression efficiency can be achieved using subpictures since subpicture boundaries are treated as picture boundaries and motion vectors pointing outside of region get padded. Depending on volumetric display capability, not all views may be required, so decoders can extract only a subset of the views for display instead of needing to extract all views.

In various embodiments of this disclosure, subpictures can be identified by an ID. For example, when subpictures are used for multiview tiled volumetric video, then a mapping between the subpicture ID and a view number is used. This mapping between subpicture ID and view number can be signaled by using a table or by other mechanisms. This mapping information can be signaled at a sequence, picture, slice, and/or, tile, etc. level.

Although FIGS. 6A and 6B illustrate an example subpicture arrangement 600 and an example volumetric multiview video frame 601 using subpictures, various changes may be made to FIGS. 6A and 6B. For example, any number of views and subpictures can be used, such as 45 different views and subpictures. Additionally, while a particular scene at various view angles of a man sitting in front of a bookshelf is used for illustration, any scene can be captured using the multiple cameras at the different view angles and divided into subpictures as shown in FIGS. 6A and 6B. Further, while MTVV format can be used, other formats such as mesh point cloud video formats can be similarly tiled and organized as subpictures according to the various viewpoints.

Figure 7A:
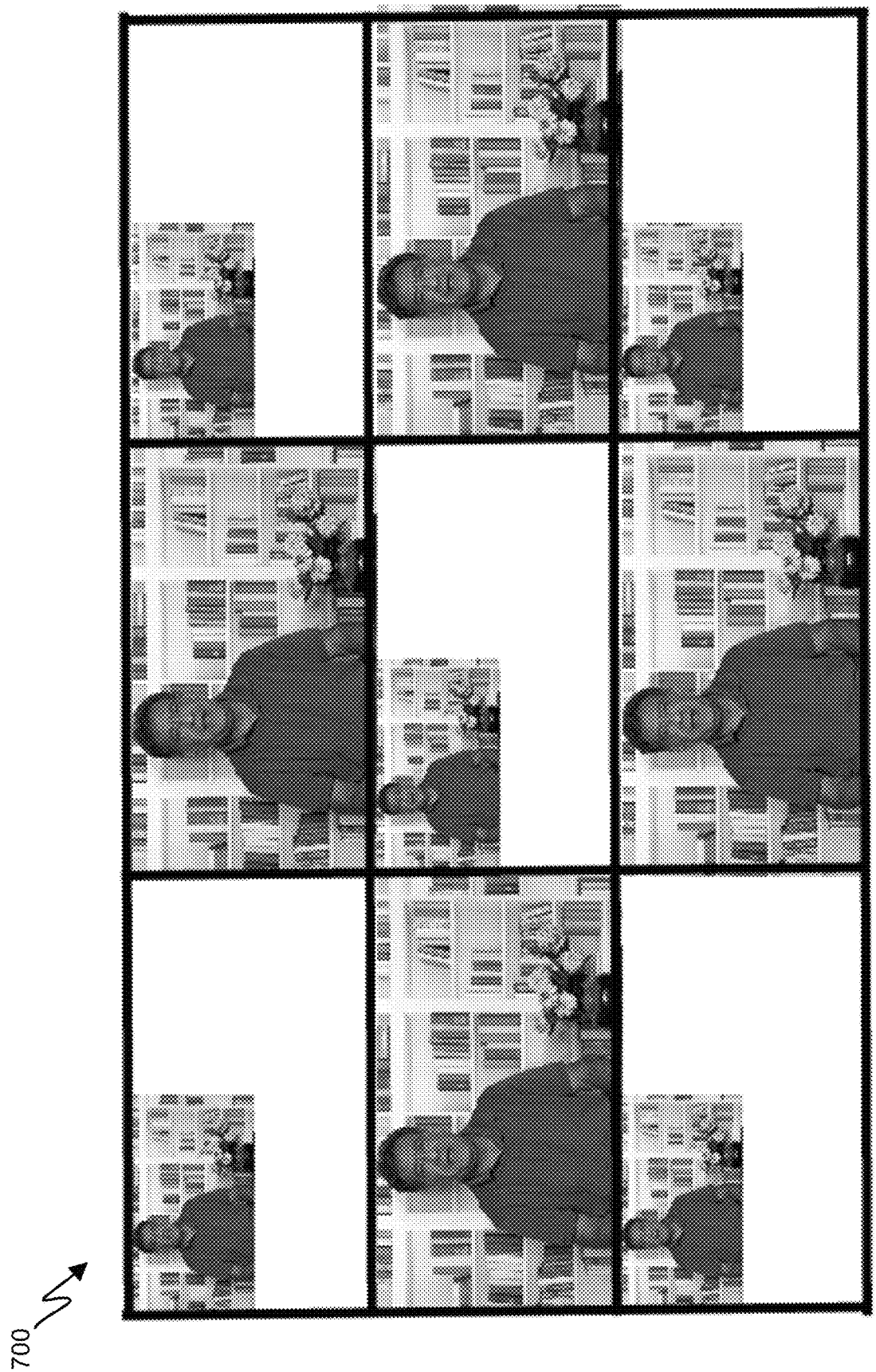
FIGS. 7A and 7B illustrate an example volumetric multiview video frame with subpictures at different resolutions and an example associated view mapping in accordance with this disclosure.
Figure 7B:
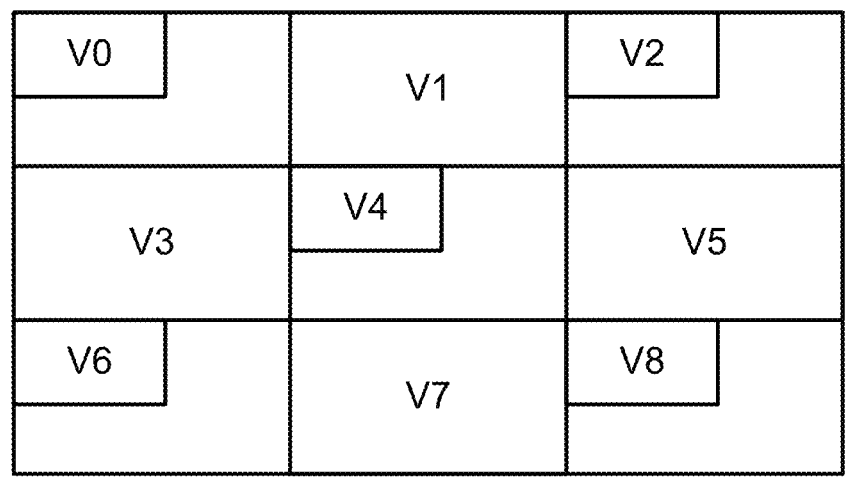

FIGS. 7A and 7B illustrate an example volumetric multiview video frame 700 with subpictures at different resolutions and an example associated view mapping 701 in accordance with this disclosure. For ease of explanation, the volumetric multiview video frame 700 and the view mapping 701 may be described as being used by the electronic device 300 of FIG. 3. However, the volumetric multiview video frame 700 and the view mapping 701 may be used with any other suitable system and any other suitable electronic device.

As shown in FIGS. 7A and 7B, not all views need to be at the highest resolution for effective decoding and display of volumetric video content. Instead, intermediate views can be at a reduced resolution since they can be upscaled using neighboring view information. As such, it is possible to improve compression efficiency of volumetric video content by including intermediate views/subpictures at a reduced resolution.

For example, as shown in the example volumetric multiview video frame 700 of FIG. 7A, every other view of the captured scene is at reduced resolution. In this example, views 0, 2, 4, 6, and 8 are provided at the reduced resolution, although it will be understood that other views such as views 1, 3, 5, and 7 could be at the reduced resolution. As shown in FIG. 7B, the example view mapping 701 provides a mapping of view and/or subpicture numbers with the different viewpoints of the scene and according to the resolution for each viewpoint. In some embodiments of this disclosure, metadata indicating the relative resolution scale factor for each of the views is signaled at a sequence, picture, slice, and/or, tile, etc. level. When subpictures are used, this metadata can additionally or alternatively be signaled at a subpicture level.

Although FIGS. 7A and 7B illustrate an example volumetric multiview video frame 700 with subpictures at different resolutions and an example view mapping 701, various changes may be made to FIGS. 7A and 7B. For example, any number of views and subpictures can be used, such as 45 different views and subpictures. Additionally, while a particular scene at various view angles of a man sitting in front of a bookshelf is used for illustration, any scene can be captured using the multiple cameras at the different view angles and divided into subpictures at different resolutions as shown in FIGS. 7A and 7B. Further, while MTVV format can be used, other formats such as mesh point cloud video formats can be similarly tiled and organized as subpictures according to the various viewpoints.

Figure 8A:
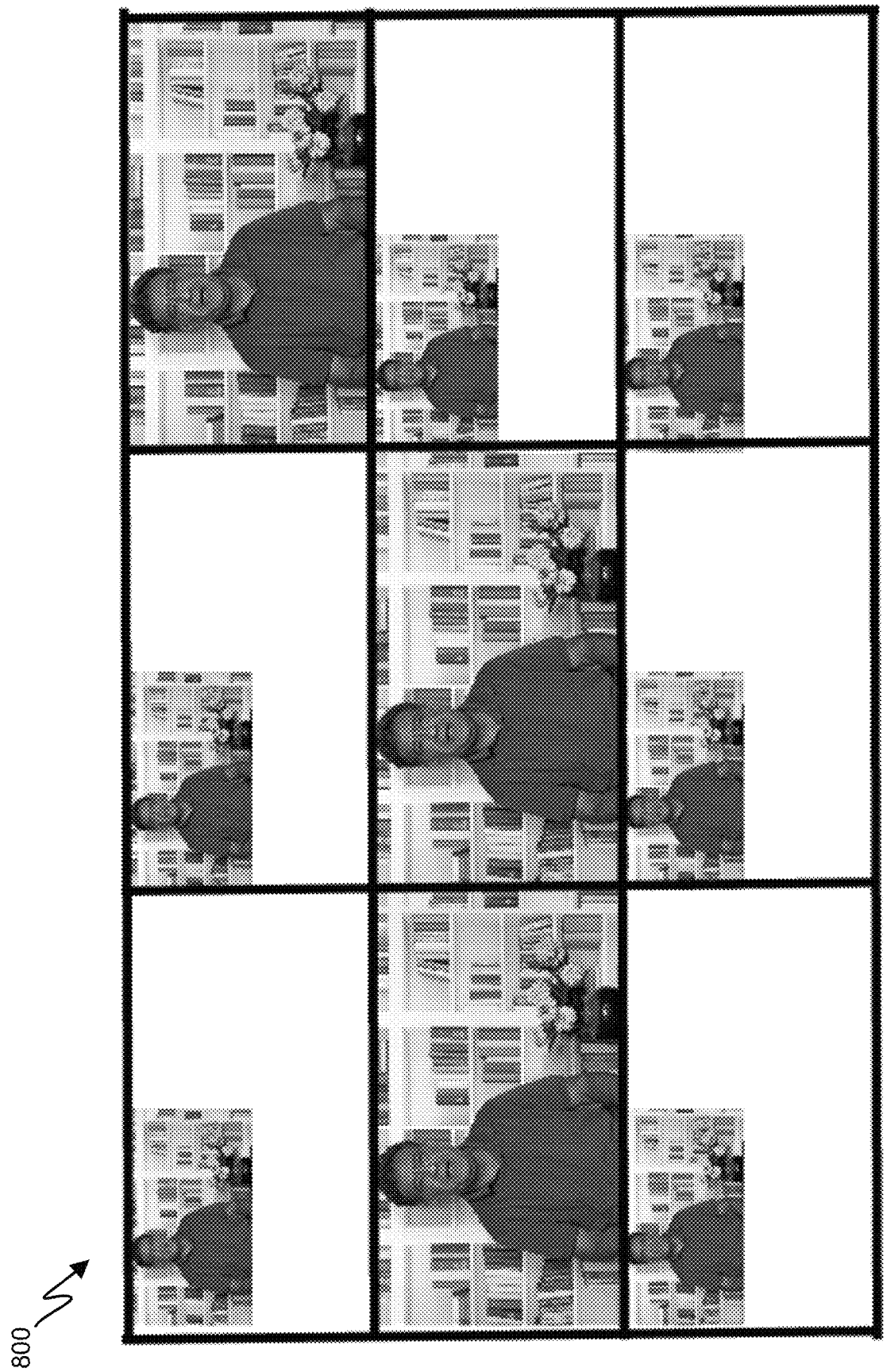
FIGS. 8A and 8B illustrate an example volumetric multiview video frame with subpictures at different resolutions according to view direction and an example associated view mapping in accordance with this disclosure.
Figure 8B:
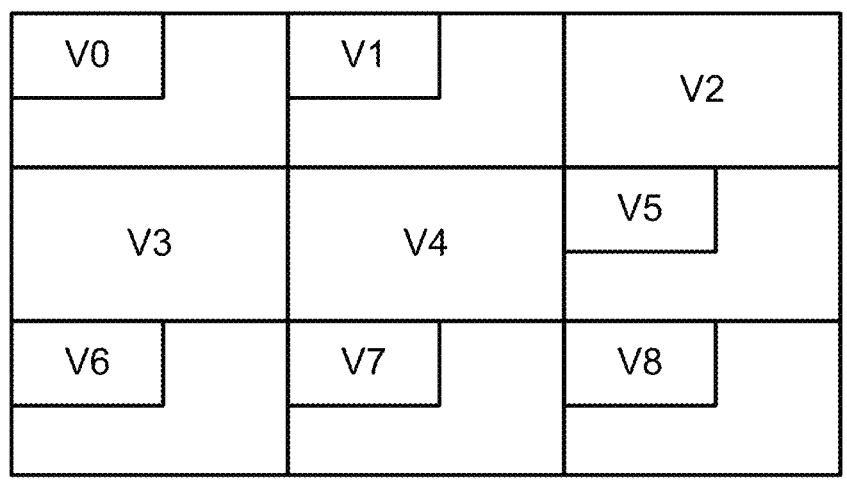

FIGS. 8A and 8B illustrate an example volumetric multiview video frame 800 with subpictures at different resolutions according to a view direction and an example associated view mapping 801 in accordance with this disclosure. For ease of explanation, the volumetric multiview video frame 800 and the view mapping 801 may be described as being used by the electronic device 300 of FIG. 3. However, the volumetric multiview video frame 800 and the view mapping 801 may be used with any other suitable system and any other suitable electronic device.

In embodiments of this disclosure, not all views need to be at the highest resolution since the user may be gazing in one direction. For example, when the user is gazing at a view direction N, views N−M to N+M can be transmitted at full resolution, while the other views are transmitted at a reduced resolution. In various embodiments of this disclosure, metadata indicating the relative resolution scale factor for each of the views can be signaled at a sequence, picture, slice, and/or, tile, etc. level. When subpictures are used, the relative resolution scale factor can be signaled at a subpicture level.

For example, FIGS. 8A and 8B illustrate an example where N=3 and M=1, such that the current view direction is at view number 3 and it is determined to use one view on each side of the view associated with the view direction. Thus, in this example shown in FIGS. 8A and 8B, view 3 (N=3), view 2 (N−M), and view 4 (N+M) are provided at full resolution while the other views are provided at one or more reduced resolutions.

Although FIGS. 8A and 8B illustrate an example volumetric multiview video frame 800 with subpictures at different resolutions according to view direction and an example associated view mapping 801, various changes may be made to FIGS. 8A and 8B. For example, any number of views and subpictures can be used, such as 45 different views and subpictures. Additionally, while a particular scene at various view angles of a man sitting in front of a bookshelf is used for illustration, any scene can be captured using the multiple cameras at the different view angles and divided into subpictures at different resolutions as shown in FIGS. 8A and 8B. Also, M can be set at any number as needed. For example, M could be set to a value of 3 such that 3 views on either side of the view associated with a user view direction are provided at full resolution. Further, while MTVV format can be used, other formats such as mesh point cloud video formats can be similarly tiled and organized as subpictures according to the various viewpoints.

Figure 9:
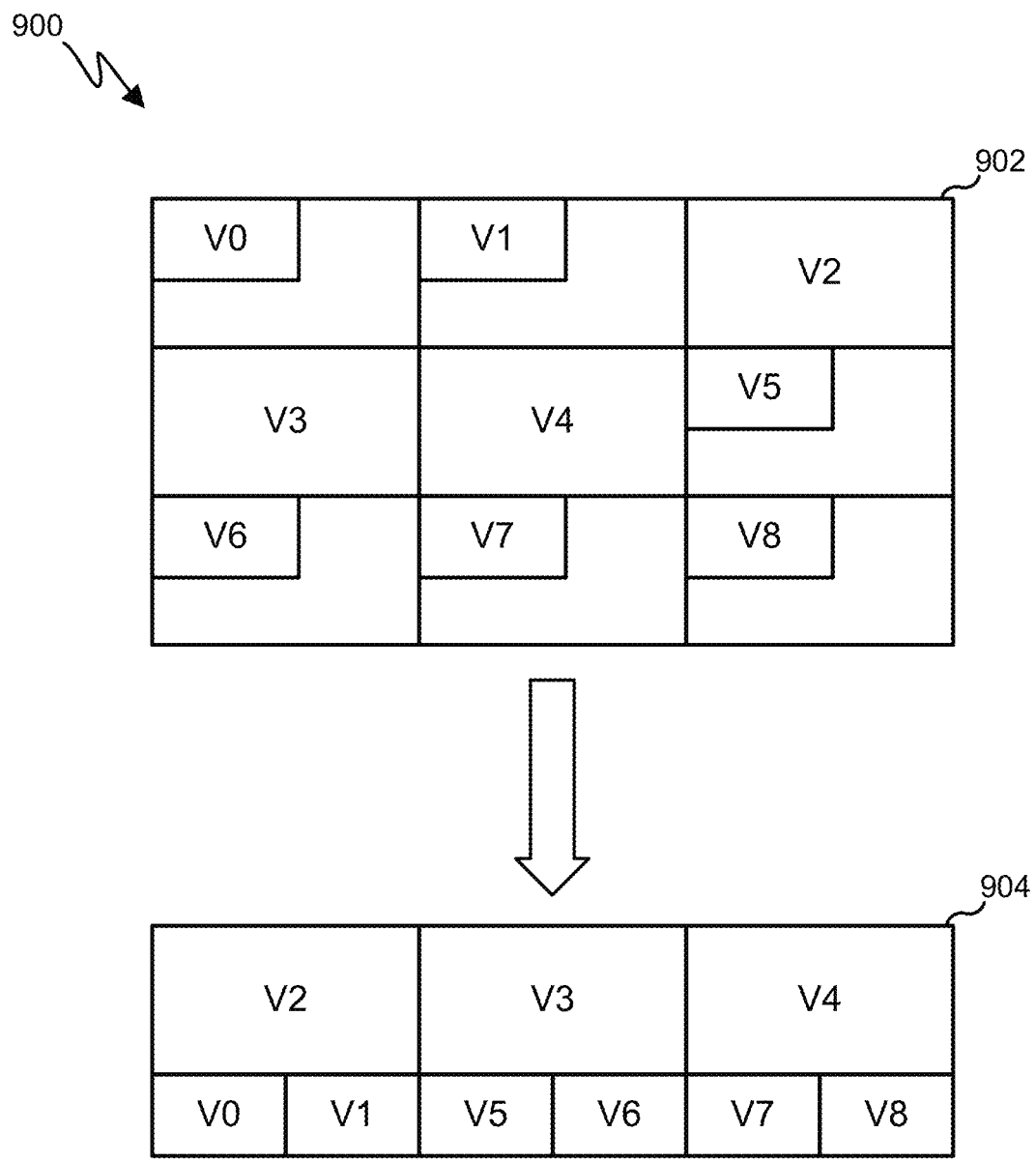
FIG. 9 illustrates an example process for packing views of a volumetric video in accordance with this disclosure.

FIG. 9 illustrates an example process 900 for packing views of a volumetric video in accordance with this disclosure. For ease of explanation, the process 900 of FIG. 9 may be described as being performed using the electronic device 300 of FIG. 3. However, the process 900 may be used with any other suitable system and any other suitable electronic device.

As described in this disclosure such as with respect to FIGS. 7A through 8B, views and/or subpictures can be provided at differing resolutions, such as according to every other view or according to user view direction. In various embodiments of this disclosure, the process 900 includes that the electronic device 300 compactly packs the views at the different resolutions in the video frame to avoid empty space. A mapping between subpicture ID and view number can be used to determine the packing order. For example, as shown in FIG. 9, a video frame 902 is provided in which views 0, 1, 5, 6, 7, and 8 are provided at one or more reduced resolutions. For the video frame 902, the subpicture IDs are mapped to view numbers as shown below in Table 1.

TABLE 1

Mapping of Subpicture IDs to View Numbers.

| Subpicture ID | View Number |
| --- | --- |
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |

As shown in Table 1, the subpicture ID values are mapped to the same values for the view numbers. However, to provide for a more efficient use of space in the video frame, the process 900 includes packing the lower resolution views to fit closely with the higher resolution views to provide a compact video frame 904. For instance, in the example shown in FIG. 9, the compact video frame 904 includes views 0 and 1 compactly packed with view 2, views 5 and 6 compactly packed with view 3, and views 7 and 8 compactly packed with view 4. This reduction of empty space in the picture leads to improvement in compression efficiency. Thus, the corresponding mapping table (which maps sub-picture ID to view number) for this example compact video frame 904 is shown in Table 2, below.

TABLE 2

Mapping of Subpicture IDs to View Number for Compact Frame.

| Subpicture ID | View Number |
| --- | --- |
| 0 | 2 |
| 1 | 3 |
| 2 | 4 |
| 3 | 0 |
| 4 | 1 |
| 5 | 5 |
| 6 | 6 |
| 7 | 7 |
| 8 | 8 |

Reduction of empty space in the picture leads to improvement in compression efficiency. The mapping table can be signaled with the compressed video bitstream such as at a sequence, picture, slice, and/or, tile, etc. level and used by a decoder in determining how to present the views.

Although FIG. 9 illustrates an example process 900 for packing views of a volumetric video, various changes may be made to FIG. 9. For example, any number of views and subpictures can be used, such as 45 different views and subpictures. Also, any number of views can be provided at the one or more reduced resolutions and the views at the lower resolutions can be compactly packed in different orders than that shown in the example of FIG. 9. Further, while MTVV format can be used, other formats such as mesh point cloud video formats can be similarly tiled and organized as subpictures according to the various viewpoints.

Figure 10:
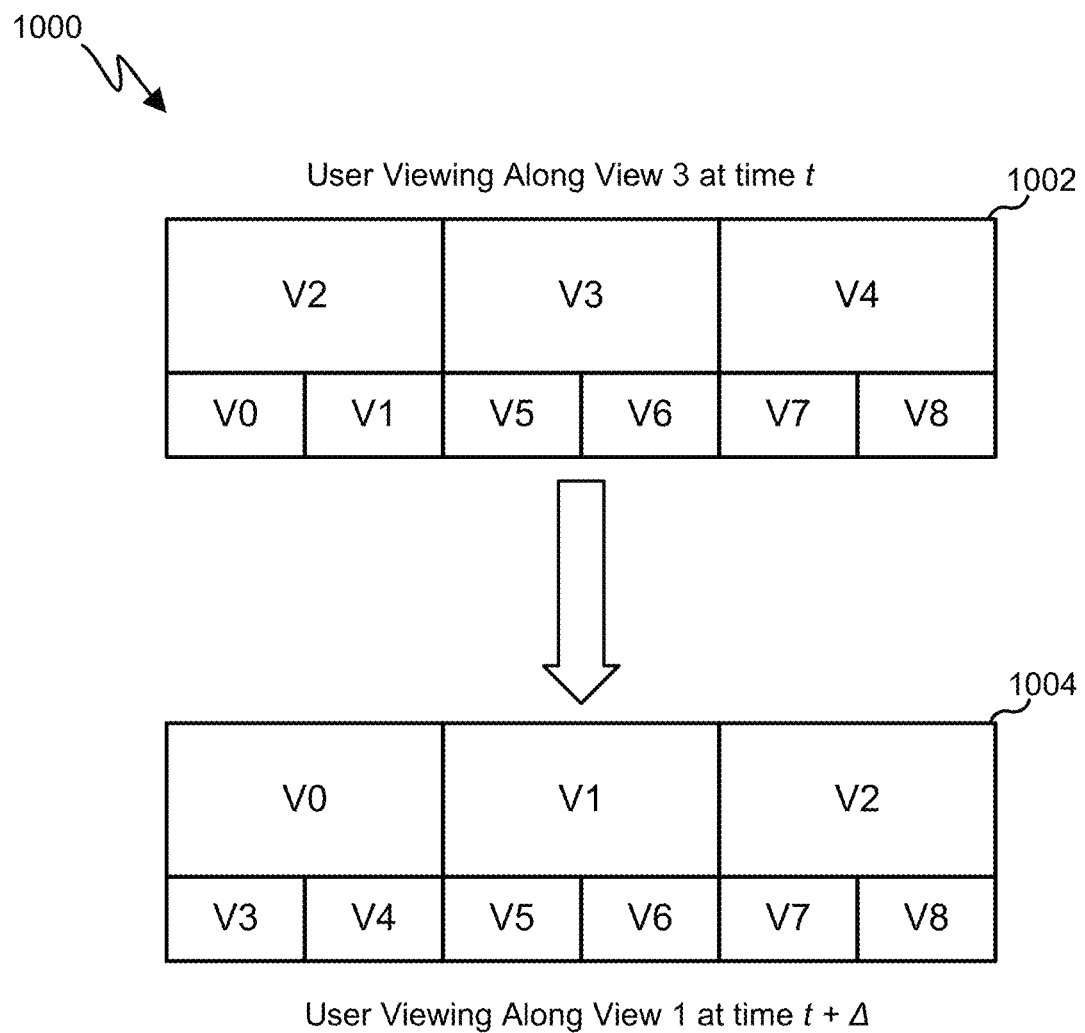
FIG. 10 illustrates an example process for packing views of a volumetric video at different points in time in accordance with this disclosure.

FIG. 10 illustrates an example process 1000 for packing views of a volumetric video at different points in time in accordance with this disclosure. For ease of explanation, the process 1000 of FIG. 10 may be described as being performed using the electronic device 300 of FIG. 3. However, the process 1000 may be used with any other suitable system and any other suitable electronic device.

As shown in FIG. 10, as the user view direction changes over time during capture of a multiview video, the electronic device 300 can compactly pack video frames according to a current user view direction, and where, for a view direction N, views N−M to N+M are transmitted at full resolution, while the other views are transmitted at a reduced resolution. For example, a first compact video frame 1002 is shown in FIG. 10 where the user view direction is associated with view 3, and, consequently, views 2, 3, and 4 are provided at full resolution while the other views are provided at a reduced resolution and compactly packed in the frame with the higher resolution frames.

However, as the user view direction might change at different points in time during capture of the multiview video, the view associated with the user view direction can be updated for those points in time such that the subpictures provided at the one or more reduced resolutions are updated. For instance, as shown in FIG. 10, an example is shown in which, at a time t+4, the user view direction changes from view 3 to view 1, and thus N=1. Therefore, views 0, 1, and 2 (N−M, N, and N+M) are provided at full resolution while the other views are provided at a reduced resolution and compactly packed in a second compact video frame 1004. Thus, as the view direction N changes, so too does the resolution used for the various views. For changing view directions, new mapping table is transmitted to indicate new mapping between views and subpicture ID for the changed user view direction. The old mapping table and the new mapping table information can be used to determine the relative locations of the views so that temporal prediction can be carried out within the same view (which could be at different resolutions in the different pictures).

Although FIG. 10 illustrates an example process 1000 for packing views of a volumetric video at different points in time, various changes may be made to FIG. 10. For example, any number of views and subpictures can be used, such as 45 different views and subpictures. Also, any number of views can be provided at the one or more reduced resolutions and the views at the lower resolutions can be compactly packed in different orders than that shown in the example of FIG. 10. Additionally, it will be understood that, while FIG. 10 shows packing arrangements at two different points in time, additional packing arrangements for additional points in time can be used according to a length of the captured video content. M can also be set at any number as needed. For example, M could be set to a value of 3 such that 3 views on either side of the view associated with a user view direction are provided at full resolution. Further, while MTVV format can be used, other formats such as mesh point cloud video formats can be similarly tiled and organized as subpictures according to the various viewpoints.

Figure 11:
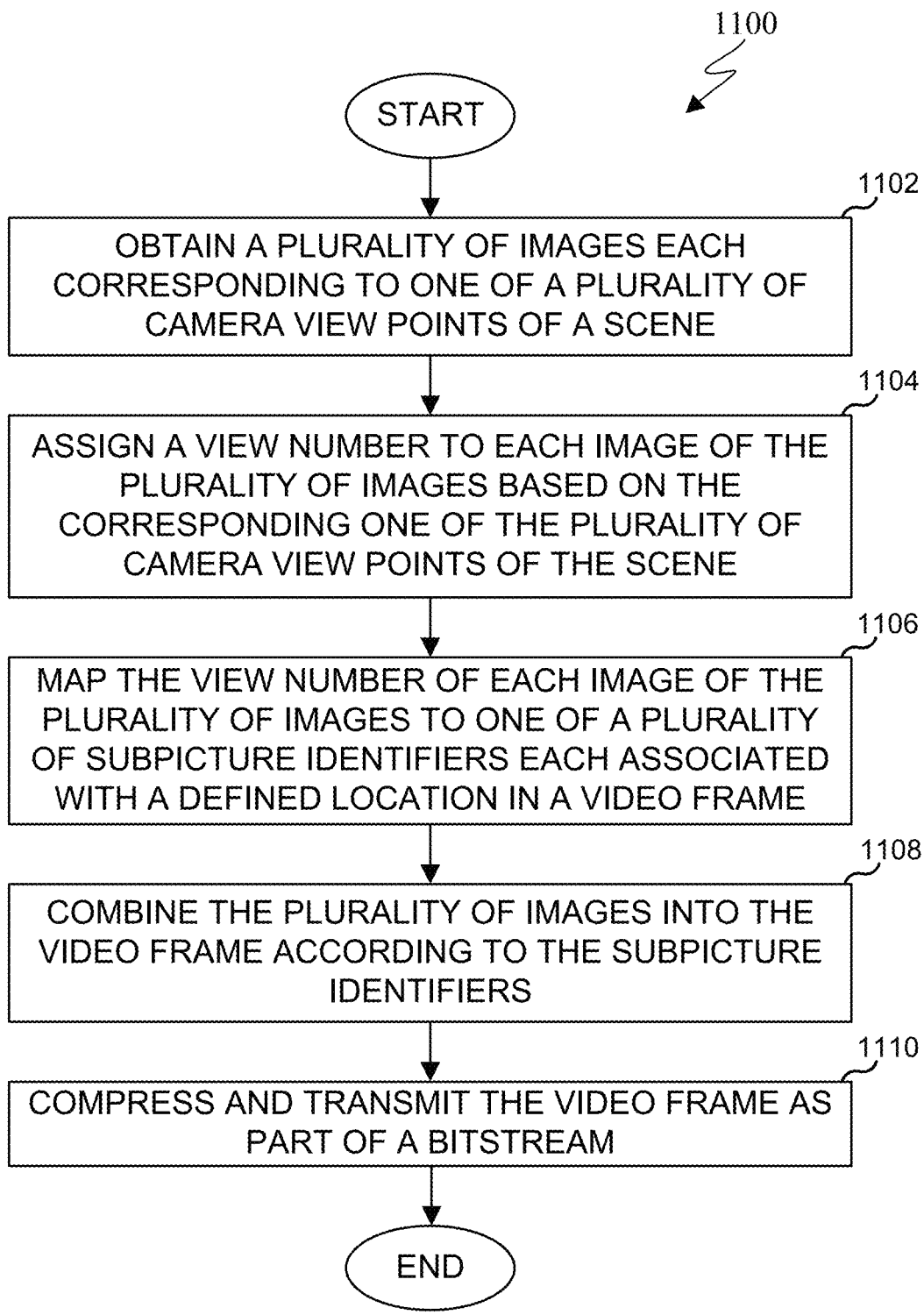
FIG. 11 illustrates an example encoding method for signaling of multiview tiled volumetric video in accordance with this disclosure.

FIG. 11 illustrates an example encoding method 1100 for signaling of multiview tiled volumetric video in accordance with this disclosure. For ease of explanation, the method 1100 of FIG. 11 is described as being performed using a processor of the electronic device 300 of FIG. 3. However, the method 1100 may be used with any other suitable system and any other suitable electronic device.

As shown in FIG. 11, at step 1102, the electronic device 300 obtains a plurality of images each corresponding to one of a plurality of camera viewpoints of a scene. At step 1104, the electronic device 300 assigns a view number to each image of the plurality of images based on the corresponding one of the plurality of camera viewpoints of the scene. At step 1106, the processor of the electronic device 300 maps the view number of each image of the plurality of images to one of a plurality of subpicture identifiers each associated with a defined location in a video frame, such as described with respect to FIG. 9 and shown for example with respect to Tables 1 and 2.

At step 1108, the electronic device 300 combines the plurality of images into the video frame according to the subpicture identifiers. In some embodiments, the electronic device 300 can provide a first image set of the plurality of images at a first resolution, provide a second image set of the plurality of images at a second resolution that is a reduced resolution relative to the first resolution, and store the first image set and the second image set of the plurality of images in the video frame.

For instance, in some embodiments, the first image set at the first resolution corresponds to camera viewpoints of the plurality of camera viewpoints associated with a user view direction of the scene. In various embodiments, to map the view number of each image of the plurality of images to one of the plurality of subpicture identifiers at step 1104, the processor of the electronic device 300 determines a packing order for the view numbers in which the first image set and the second image set are compactly packed in the video frame based on their different resolutions to reduce empty space in the video frame, and maps the view number of each image of the plurality of images to one of the plurality of subpicture identifiers according to the packing order.

As described in this disclosure, in various embodiments, the processor of the electronic device 300 can also identify a change in the user view direction and determine a new packing order for the view numbers based on a change in resolution associated with one or more of the view numbers, where the change in resolution is based on the change in the user view direction.

At step 1110, the electronic device compresses and transmits the video frame as part of a bitstream including the encoded data. The output bitstream can be transmitted to an external device or to a storage on the electronic device 300. In various embodiments, the mapping of the view numbers and the plurality of subpicture identifiers is signaled in the bitstream. For example, the electronic device 300 can encode metadata in the bitstream signaling a relative resolution scale factor for each image of the plurality of images.

Although FIG. 11 illustrates one example encoding method 1100 for signaling of multiview tiled volumetric video, various changes may be made to FIG. 11. For example, while shown as a series of steps, various steps in FIG. 11 may overlap, occur in parallel, or occur any number of times.

Figure 12:
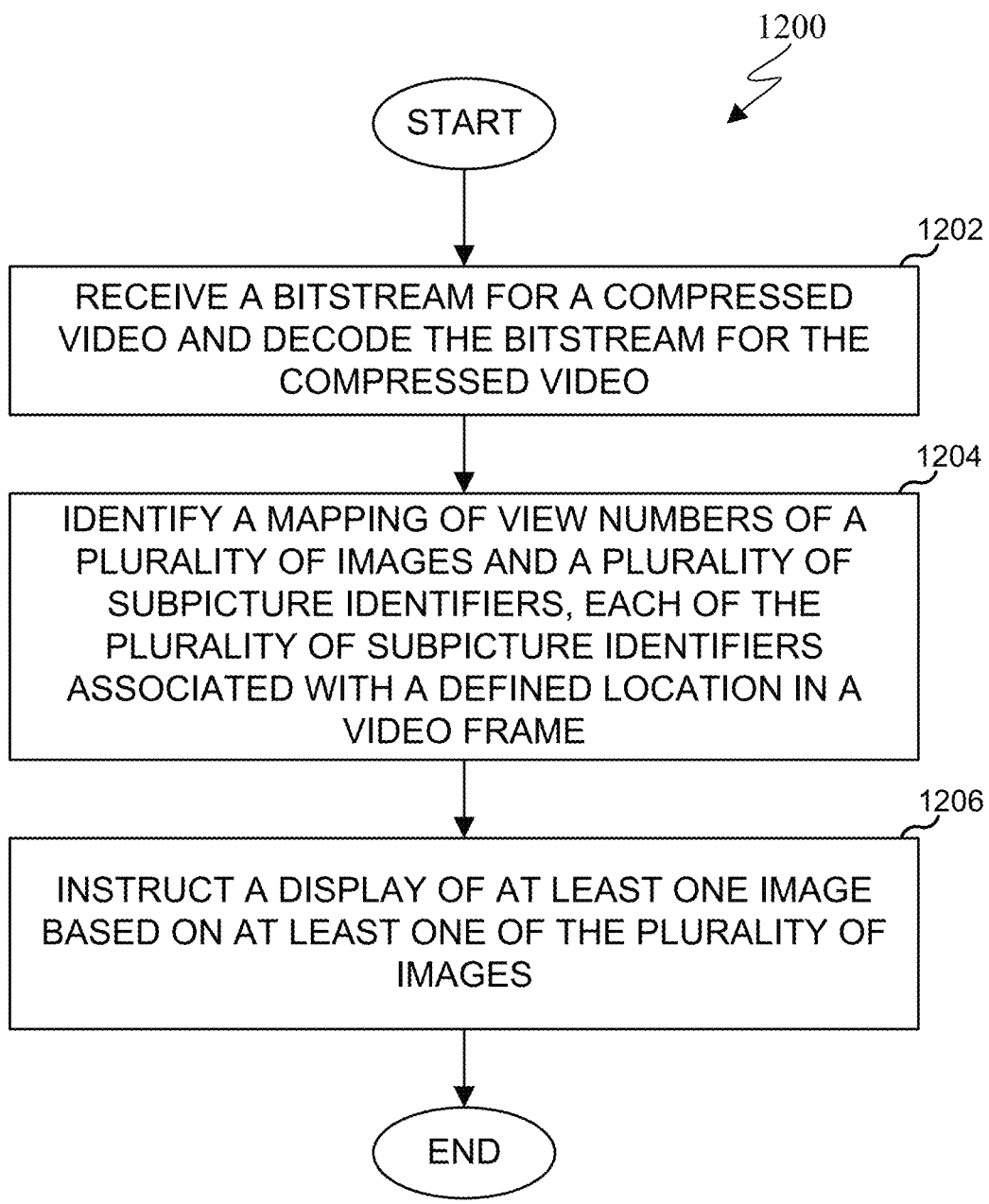
FIG. 12 illustrates an example decoding method for signaling of multiview tiled volumetric video in accordance with this disclosure.

FIG. 12 illustrates an example decoding method 1200 for signaling of multiview tiled volumetric video in accordance with this disclosure. For ease of explanation, the method 1200 of FIG. 12 is described as being performed using a processor of the electronic device 300 of FIG. 3. However, the method 1200 may be used with any other suitable system and any other suitable electronic device.

As shown in FIG. 12, at step 1202, the electronic device 300 receives a bitstream for a compressed video and the processor of the electronic device 300 decodes the bitstream for the compressed video. At step 1204, the processor of the electronic device 300 identifies a mapping of view numbers of a plurality of images and a plurality of subpicture identifiers. Each of the plurality of subpicture identifiers can be associated with a defined location in a video frame, and the mapping can be signaled in the bitstream, where each one of the view numbers is assigned to one image of the plurality of images based on a corresponding one of a plurality of camera viewpoints of a scene.

In some embodiments, a first image set of the plurality of images is at a first resolution, and a second image set of the plurality of images is at a second resolution that is a reduced resolution relative to the first resolution. In various embodiments, the first image set at the first resolution corresponds to camera viewpoints of the plurality of camera viewpoints associated with a user view direction of the scene. In some embodiments, the processor of the electronic device 300 can identify metadata included in the bitstream that signals a relative resolution scale factor for each image of the plurality of images. In some embodiments, the mapping of the view numbers and the plurality of subpicture identifiers is signaled in the bitstream in a table format.

In various embodiments, the first image set and the second image set are compactly packed in the video frame to reduce empty space in the video frame according to a packing order for the view numbers, and the mapping of the view numbers and the plurality of subpicture identifiers is based on the packing order. As such, the method 1200 may also include the processor of the electronic device 300 identifying another packing order for another video frame in the bitstream, where the other packing order is based on a change in resolution associated with one or more of the view numbers and based on a change in the user view direction.

At step 1206, the processor of the electronic device 300 instructs a display of at least one image based on at least one of the plurality of images. In some embodiments, a decoded/reconstructed multiview video can be transmitted to an external device or to a storage on the electronic device 300.

Although FIG. 12 illustrates one example of a decoding method 1200 for signaling of multiview tiled volumetric video, various changes may be made to FIG. 12. For example, while shown as a series of steps, various steps in FIG. 12 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
   a communication interface configured to receive a bitstream for a compressed video; and
   a processor operably coupled to the communication interface, the processor configured to:
      decode the bitstream for the compressed video;
      identify a mapping of view numbers of a plurality of images and a plurality of subpicture identifiers, each of the plurality of subpicture identifiers associated with a defined location in a video frame, wherein the mapping is signaled in the bitstream, and wherein each one of the view numbers is assigned to one image of the plurality of images based on a corresponding one of a plurality of camera viewpoints of a scene; and
      instruct a display of at least one image based on at least one of the plurality of images.

2. The apparatus of claim 1, wherein:
   a first image set of the plurality of images is at a first resolution;
   a second image set of the plurality of images is at a second resolution; and
   the second resolution is a reduced resolution relative to the first resolution.

3. The apparatus of claim 2, wherein the processor is further configured to identify metadata included in the bitstream that signals a relative resolution scale factor for each image of the plurality of images.

4. The apparatus of claim 2, wherein the first image set at the first resolution corresponds to camera viewpoints of the plurality of camera viewpoints associated with a user view direction of the scene.

5. The apparatus of claim 4, wherein:
   the first image set and the second image set are compactly packed in the video frame to reduce empty space in the video frame according to a packing order for the view numbers; and
   the mapping of the view numbers and the plurality of subpicture identifiers is based on the packing order.

6. The apparatus of claim 5, wherein the processor is further configured to identify another packing order for another video frame in the bitstream, wherein the other packing order is based on a change in resolution associated with one or more of the view numbers and based on a change in the user view direction.

7. The apparatus of claim 1, wherein the mapping of the view numbers and the plurality of subpicture identifiers is signaled in the bitstream in a table format.

8. A method comprising:
   receiving and decoding a bitstream for a compressed video;
   identifying a mapping of view numbers of a plurality of images and a plurality of subpicture identifiers, each of the plurality of subpicture identifiers associated with a defined location in a video frame, wherein the mapping is signaled in the bitstream, and wherein each one of the view numbers is assigned to one image of the plurality of images based on a corresponding one of a plurality of camera viewpoints of a scene; and
   instructing a display of at least one image based on at least one of the plurality of images.

9. The method of claim 8, wherein:
   a first image set of the plurality of images is at a first resolution;
   a second image set of the plurality of images is at a second resolution; and
   the second resolution is a reduced resolution relative to the first resolution.

10. The method of claim 9, further comprising identifying metadata included in the bitstream that signals a relative resolution scale factor for each image of the plurality of images.

11. The method of claim 9, wherein the first image set at the first resolution corresponds to camera viewpoints of the plurality of camera viewpoints associated with a user view direction of the scene.

12. The method of claim 11, wherein:
   the first image set and the second image set are compactly packed in the video frame to reduce empty space in the video frame according to a packing order for the view numbers; and
   the mapping of the view numbers and the plurality of subpicture identifiers is based on the packing order.

13. The method of claim 12, further comprising identifying another packing order for another video frame in the bitstream, wherein the other packing order is based on a change in resolution associated with one or more of the view numbers and based on a change in the user view direction.

14. The method of claim 8, wherein the mapping of the view numbers and the plurality of subpicture identifiers is signaled in the bitstream in a table format.

15. An apparatus comprising:
   a communication interface; and
   a processor operably coupled to the communication interface, the processor configured to:
      obtain a plurality of images each corresponding to one of a plurality of camera viewpoints of a scene;
      assign a view number to each image of the plurality of images based on the corresponding one of the plurality of camera viewpoints of the scene;
      map the view number of each image of the plurality of images to one of a plurality of subpicture identifiers each associated with a defined location in a video frame;
      combine the plurality of images into the video frame according to the subpicture identifiers; and compress and transmit the video frame as part of a bitstream, wherein the mapping of the view numbers and the plurality of subpicture identifiers is signaled in the bitstream.

16. The apparatus of claim 15, wherein, to combine the plurality of images into the video frame, the processor is further configured to:

provide a first image set of the plurality of images at a first resolution;

provide a second image set of the plurality of images at a second resolution, wherein the second resolution is a reduced resolution relative to the first resolution; and store the first image set and the second image set of the plurality of images in the video frame.

17. The apparatus of claim 16, wherein the processor is further configured to encode metadata in the bitstream signaling a relative resolution scale factor for each image of the plurality of images.

18. The apparatus of claim 16, wherein the first image set at the first resolution corresponds to camera viewpoints of the plurality of camera viewpoints associated with a user view direction of the scene.

19. The apparatus of claim 18, wherein, to map the view number of each image of the plurality of images to one of the plurality of subpicture identifiers, the processor is further configured to:

determine a packing order for the view numbers in which the first image set and the second image set are compactly packed in the video frame to reduce empty space in the video frame; and map the view number of each image of the plurality of images to one of the plurality of subpicture identifiers according to the packing order.

20. The apparatus of claim 19, wherein the processor is further configured to:

identify a change in the user view direction; and determine a new packing order for the view numbers based on a change in resolution associated with one or more of the view numbers, where the change in resolution is based on the change in the user view direction.

* * * * *